(12) United States Patent
Kim et al.

(10) Patent No.: US 11,743,824 B2
(45) Date of Patent: Aug. 29, 2023

(54) METHOD AND DEVICE FOR MONITORING PDCCH IN WIRELESS COMMUNICATION SYSTEM

(71) Applicant: Samsung Electronics Co., Ltd., Gyeonggi-do (KR)

(72) Inventors: Taehyoung Kim, Gyeonggi-do (KR); Jinkyu Kang, Gyeonggi-do (KR); Youngbum Kim, Gyeonggi-do (KR); Younsun Kim, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 129 days.

(21) Appl. No.: 17/281,082

(22) PCT Filed: Sep. 27, 2019

(86) PCT No.: PCT/KR2019/012643
§ 371 (c)(1),
(2) Date: Mar. 29, 2021

(87) PCT Pub. No.: WO2020/067803
PCT Pub. Date: Apr. 2, 2020

(65) Prior Publication Data
US 2021/0368447 A1 Nov. 25, 2021

(30) Foreign Application Priority Data
Sep. 28, 2018 (KR) .................. 10-2018-0116570

(51) Int. Cl.
*H04W 52/02* (2009.01)
*H04J 11/00* (2006.01)

(52) U.S. Cl.
CPC .... *H04W 52/0235* (2013.01); *H04W 52/0261* (2013.01); *H04J 11/0079* (2013.01)

(58) Field of Classification Search
CPC ............... H04W 52/0235; H04W 52/0261
See application file for complete search history.

(56) References Cited

U.S. PATENT DOCUMENTS

2014/0064170 A1  3/2014  Seo
2020/0092814 A1* 3/2020  Zhou ............... H04L 5/0098

OTHER PUBLICATIONS

Qualcomm Incorporated, "Efficient Monitoring of DL Control Channels", R1-1720417, 3GPP TSG RAN WG1 Meeting #91, Nov. 27-Dec. 1, 2017, 11 pages.

(Continued)

*Primary Examiner* — James P Duffy
(74) *Attorney, Agent, or Firm* — The Farrell Law Firm, P.C.

(57) ABSTRACT

Provided are a method and device for monitoring a physical downlink control channel (POOCH) in a wireless communication system. The method, performed by a terminal supporting carrier aggregation, of monitoring the physical downlink control channel (PDCCH) includes: receiving configuration information about a low power mode indicator that controls monitoring of a PDCCH, in at least one of a plurality of cells; based on the configuration information, determining whether the low power mode indicator is detected, in at least one cell for which the configuration information is received; and based on a result of the determining and information about a cell associated with the low power mode indicator, controlling the monitoring of the PDCCH, in a cell associated with the low power mode indicator from among the plurality of cells.

15 Claims, 11 Drawing Sheets

(56) References Cited

OTHER PUBLICATIONS

OPPO, "Considerations on NR Power Saving", RP-180834, 3GPP TSG RAN Meeting #80, Jun. 11-14, 2018, 3 pages.
Vivo, "On NR UE Power Saving", R1-1808252, 3GPP TSG RAN WG1 #94, Aug. 20-24, 2018, 8 pages.
Huawei, HiSilicon, General Considerations on UE Power Saving in Rel-16, R1-1809333, 3GPP TSG RAN WG1 Meeting #94, Aug. 20-24, 2018, 5 pages.
International Search Report dated Jan. 10, 2020 issued in counterpart application No. PCT/KR2019/012643, 17 pages.

* cited by examiner

METHOD AND DEVICE FOR MONITORING PDCCH IN WIRELESS COMMUNICATION SYSTEM

PRIORITY

This application is a National Phase Entry of PCT International Application No. PCT/KR2019/012643, which was filed on Sep. 27, 2019, and claims priority to Korean Patent Application No. 10-2018-0116570, which was filed on Sep. 28, 2018, the entire content of each of which is incorporated herein by reference.

TECHNICAL FIELD

The disclosure relates to a method and device for monitoring a physical downlink control channel (PDCCH) in a wireless communication system.

BACKGROUND ART

To meet the increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long-term evolution (post-LTE)' systems. In order to achieve a high data rate, consideration is given to implementing 5G communication systems in millimeter wave (mmW) frequency bands (e.g., 60 GHz bands). To reduce path loss of radio waves and increase a transmission distance of radio waves in the ultra-high frequency band, for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks, for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multipoints (CoMP), and reception interference cancellation have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network whereby humans generate and consume information to the Internet-of-things (IoT) whereby distributed elements such as objects exchange information with each other to process the information. Internet-of-Everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In an IoT environment, intelligent Internet technology (IT) services may be provided to collect and analyze data obtained from connected objects to generate new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Accordingly, various attempts are being made to apply 5G communication systems to the IoT network. For example, technology such as a sensor network, M2M communication, or MTC is implemented by 5G communication technology such as beam-forming, MIMO, or array antenna. The application of a cloud RAN as big data processing technology may also be considered as an example of convergence of 5G technology and IoT technology.

Because various services may be provided due to the aforementioned technical features and the development of wireless communication systems, methods for effectively providing these services are required.

DESCRIPTION OF EMBODIMENTS

Technical Problem

Provided are an apparatus and method capable of effectively providing services in a mobile communication system.

Solution to Problem

According to an embodiment of the disclosure, a method, performed by a terminal supporting carrier aggregation, of monitoring a physical downlink control channel (PDCCH) includes: receiving configuration information about a low power mode indicator that controls monitoring of a PDCCH, in at least one of a plurality of cells; based on the configuration information, determining whether the low power mode indicator is detected, in at least one cell for which the configuration information is received; and based on a result of the determining and information about a cell associated with the low power mode indicator, controlling the monitoring of the PDCCH, in a cell associated with the low power mode indicator from among the plurality of cells.

The low power mode indicator may include, as a signal for controlling the monitoring, at least one of downlink control information (DCI), a wake-up signal (WUS), a go-to-sleep (GTS) signal, or a monitoring adaptation signal (MAS).

The receiving of the configuration information may include receiving the configuration information through higher layer signaling including a master information block (MIB), a system information block (SIB), or a radio resource control (RRC) message.

The configuration information may include at least one of transmission resource information, transmission period information, monitoring duration information, occasion configuration information, transmission configuration indicator (TCI) information, or quasi co-located (QCL) configuration information, for detection of the low power mode indicator.

The information about the cell associated with the low power mode indicator may be included in higher layer signaling received from a base station, included in the configuration information, or included in the low power mode indicator.

The cell associated with the low power mode indicator may include an activated cell from among the plurality of cells, or include a cell pre-defined by the base station from among the plurality of cells.

The controlling of the monitoring of the PDCCH may include: when the low power mode indicator is determined to have been detected, performing monitoring for detecting the PDCCH in the cell associated with the low power mode indicator, based on information about the cell associated with the low power mode indicator; and when the low power mode indicator is determined to have not been, not performing monitoring for detecting the PDCCH in the cell associated with the low power mode indicator, based on the information about the cell associated with the low power mode indicator.

The at least one cell for which the configuration information is received may be a cell corresponding to a frequency band lower than or equal to a certain frequency, and the cell associated with the low power mode indicator may be a cell corresponding to a frequency band higher than or equal to a certain frequency.

According to an embodiment of the disclosure, a terminal supporting carrier aggregation includes: a transceiver; and at least one processor connected to the transceiver, wherein the at least one processor is further configured to: receive configuration information about a low power mode indicator that controls monitoring of a physical downlink control channel (PDCCH), in at least one of a plurality of cells; based on the configuration information, determine whether the low power mode indicator is detected, in at least one cell for which the configuration information is received; and based on a result of the determining and information about a cell associated with the low power mode indicator, control the monitoring of the PDCCH, in a cell associated with the low power mode indicator from among the plurality of cells.

The low power mode indicator may include, as a signal for controlling the monitoring, at least one of downlink control information (DCI), a wake-up signal (WUS), a go-to-sleep (GTS) signal, or a monitoring adaptation signal (MAS).

The configuration information may include at least one of transmission resource information, transmission period information, monitoring duration information, occasion configuration information, transmission configuration indicator (TCI) information, or quasi co-located (QCL) configuration information, for detection of the low power mode indicator.

The information about the cell associated with the low power mode indicator may be included in higher layer signaling received from a base station, included in the configuration information, or included in the low power mode indicator.

The cell associated with the low power mode indicator may include an activated cell from among the plurality of cells, or include a cell pre-defined by the base station from among the plurality of cells.

The cell associated with the low power mode indicator may include an activated cell from among the plurality of cells, or include a cell pre-defined by the base station from among the plurality of cells.

The at least one processor may be further configured to: when the low power mode indicator is determined to have been detected, perform monitoring for detecting the PDCCH in the cell associated with the low power mode indicator, based on information about the cell associated with the low power mode indicator; and when the low power mode indicator is determined to have not been detected, not perform monitoring for detecting the PDCCH in the cell associated with the low power mode indicator, based on the information about the cell associated with the low power mode indicator.

Advantageous Effects of Disclosure

Embodiments of the disclosure provide an apparatus and method for providing a service effectively in a mobile communication system.

MODE OF DISCLOSURE

Figure 1:
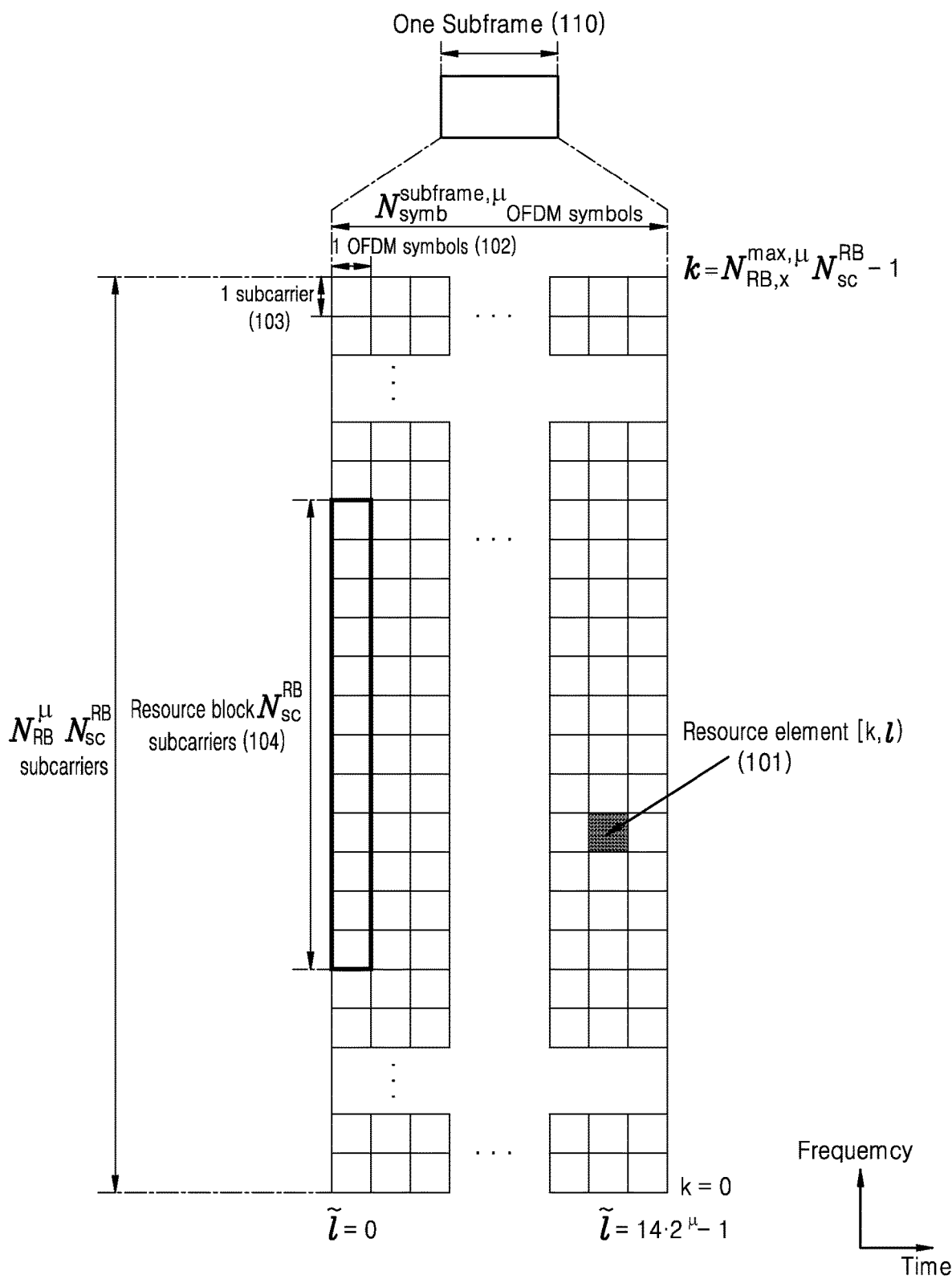
FIG. 1 illustrates a basic structure of a time-frequency domain in $5^{th}$ generation (5G), according to an embodiment of the disclosure.

Hereinbelow, embodiments of the disclosure will be described in detail with reference to the accompanying drawings.

In describing the embodiments of the disclosure, descriptions of technical contents that are well known in the technical field to which the disclosure belongs and are not directly related to the disclosure will be omitted. This is to more clearly convey the gist of the disclosure by omitting unnecessary description.

For the same reason, some components of the accompanying drawings may be exaggeratedly shown, omitted, or schematically shown. The size of each component does not entirely reflect the actual size thereof. In the drawings, the same or corresponding components are denoted by the same reference numerals.

The advantages and features of the disclosure and the accomplishing methods thereof will become apparent from the embodiments of the disclosure described below in detail with reference to the accompanying drawings. The embodiments of the disclosure may, however, be embodied in many different forms and should not be construed as limited to the embodiments set forth herein; rather, these embodiments of the disclosure are provided so that this disclosure will be thorough and complete, and will fully convey the scope of the embodiments of the disclosure to those of ordinary skill in the art. The same reference numerals refer to the same components throughout the specification. Also, when detailed descriptions about known functions or components associated with the disclosure are determined to unnecessarily obscure the gist of the disclosure, the detailed descriptions will be omitted. The terms as used herein are those defined by taking into account functions in the disclosure, but the terms may vary depending on the intention of users or those of ordinary skill in the art, precedents, or the like. Therefore, the definitions should be made based on the contents throughout the specification.

Hereinbelow, a base station (BS), which is a subject for allocating resources to terminals, may be at least one of gNode B, eNode B, Node B, a wireless connection unit, a base station controller, or a node on a network. A terminal may include a user equipment (UE), a mobile station (MS), a cellular phone, a smartphone, a computer, or a multimedia system capable of performing a communication function. In the disclosure, a downlink (DL) may mean a wireless transmission path of a signal transmitted from a BS to a terminal, and an uplink (UL) may mean a wireless transmission path of a signal transmitted from a terminal to a BS. Also, hereinbelow, a long term evolution (LTE) or LTE-Advanced (LTE-A) system may be described as an example; however, embodiments of the disclosure may also be applied to other communication systems having similar technical backgrounds or channel types. For example, 5th generation (5G) new radio (NR) mobile communication technology developed after LTE-A may belong thereto, and hereinbelow, 5G may be indicated as a concept including existing LTE, LTE-A, and other similar services. Also, the disclosure may also be applied to other communication systems through some modifications without departing from the scope of the disclosure by the judgment of those of ordinary skill in the art.

It will be appreciated that the combinations of blocks and flowchart illustrations in the process flow diagrams may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the block (or blocks) of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated successively may actually be executed substantially concurrently, or the blocks may sometimes be performed in a reverse order according to the corresponding function.

Here, the term "unit" in the embodiments means a software component or hardware component such as a Field-Programmable Gate Array (FPGA) or an Application-Specific Integrated Circuit (ASIC), and performs a specific function. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. Also, in embodiments of the disclosure, the "unit" may include one or more processors.

Wireless communication systems have passed initial stages of providing voice-based services, and are being developed to wide-band wireless communication systems of providing high-speed, high-quality packet data services, such as, for example, high speed packet access (HSPA) of the 3GPP, LTE or evolved universal terrestrial radio access (E-UTRA), LTE-A, LTE-Pro, high rate packet data (HRPD) of the 3GPP2, ultra mobile broadband (UMB), and communication standards of the IEEE 802.16e and the like.

As a representative example of the wide-band wireless communication systems, an LTE system has adopted an orthogonal frequency division multiplexing (OFDM) scheme in a DL, and a single carrier frequency division multiple access (SC-FDMA) scheme in an UL. The UL means a wireless link through which a UE or a MS transmits data or control signals to eNode B or a BS, and the DL means a wireless link through which eNode B or a BS transmits data or control signals to a UE or a MS. The above-described multiple access schemes may identify data or control information of different users in a manner that time-frequency resources for carrying the data or control information of the users are assigned and managed not to overlap each other, that is, to achieve orthogonality therebetween.

As post-LTE systems, 5G systems may have to support services capable of simultaneously satisfying various requirements because they may have to freely reflect various requirements of users, service providers, and the like. Services considered for the 5G systems include enhanced mobile broadband (eMBB), massive machine-type communication (mMTC), ultra-reliability low-latency communication (URLLC) services, or the like.

The eMBB aims to provide an improved data rate than a data rate supported by the existing LTE, LTE-A, or LTE-Pro. For example, in a 5G communication system, the eMBB should be able to provide a peak data rate of 20 Gbps in a downlink and a peak data rate of 10 Gbps in an uplink from the viewpoint of a BS. Also, the 5G communication system aims to provide a maximum data rate and simultaneously to provide an increased user-perceived data rate of a UE. In order to satisfy such requirements, there is a need for an improvement in transmission and reception technology including an improved multiple-input multiple-output (MIMO) transmission technology. Also, the 5G communication system may satisfy a required data rate by using a frequency bandwidth wider than 20 MHz in the 3 GHz to 6 GHz or 6 GHz or more frequency band while transmitting signals by using a transmission bandwidth of up to 20 MHz in the 2 GHz band used in the LTE.

Simultaneously, the mMTC is being considered to support application services such as IoT in 5G communication systems. The mMTC requires supporting connections to massive UEs in a cell, UE coverage enhancement, an improved battery life time, UE cost reduction, etc. to efficiently provide the IoT. The IoT is connected to various sensors and devices to provide a communication function. Therefore, a large number of UEs (for example, 1,000,000 UEs/km²) in a cell need to be supported in the mMTC system. Also, because a UE supporting the mMTC has a high probability of being located in a shadow zone such as the basement of a building, which is not covered by a cell, due to its service characteristics, for mMTC service, wide coverage compared to those required by other services that 5G communication systems provide may be required. The terminal supporting the mMTC should be configured as a low-cost terminal and may require a very long battery life time of about 10 years to about 15 years because it is difficult to frequently replace the battery of the terminal.

The URLLC refers to cellular-based wireless communication services used for mission-critical purposes. For example, services for remote control of robots or machinery, industrial automation, unmanned aerial vehicles, remote health care, emergency alerts, and the like may be included therein. Therefore, the URLLC should provide communications providing ultra-low latency and ultra-high reliability. For example, a service supporting the URLLC needs to satisfy air interface latency that is shorter than 0.5 milliseconds, and also, the service has a requirement of a packet error rate that is equal to or lower than $10^{-5}$. Thus, for the service supporting the URLLC, the 5G system should provide a transmit time interval (TTI) smaller than other services and simultaneously has a design requirement for allocating wide resources in a frequency band so as to ensure reliability of a communication link.

The three services, i.e., the eMBB, the URLLC, and the mMTC, of 5G may be multiplexed and transmitted in one system. In this regard, the services may use different transmission and reception schemes and different transmission and reception parameters so as to satisfy different requirements of the services. However, 5G is not limited to the three services described above.

Hereinbelow, a frame structure of the 5G system will be described in more detail with reference to the accompanying drawings.

FIG. 1 illustrates a basic structure of a time-frequency domain, which is a radio resource domain through which a data channel or a control channel is transmitted, in a 5G system, according to some embodiments of the disclosure.

In FIG. 1, a horizontal axis represents a time domain and a vertical axis represents a frequency domain. In the time and frequency domain, a base unit of a resource is a resource element (RE) 101 and may be defined by one OFDM symbol 102 on a time axis and one subcarrier 103 on a frequency axis. In the frequency domain, $N_{SC}^{RB}$ (e.g., 12) consecutive REs may configure one resource block (RB) 104.

Figure 2:
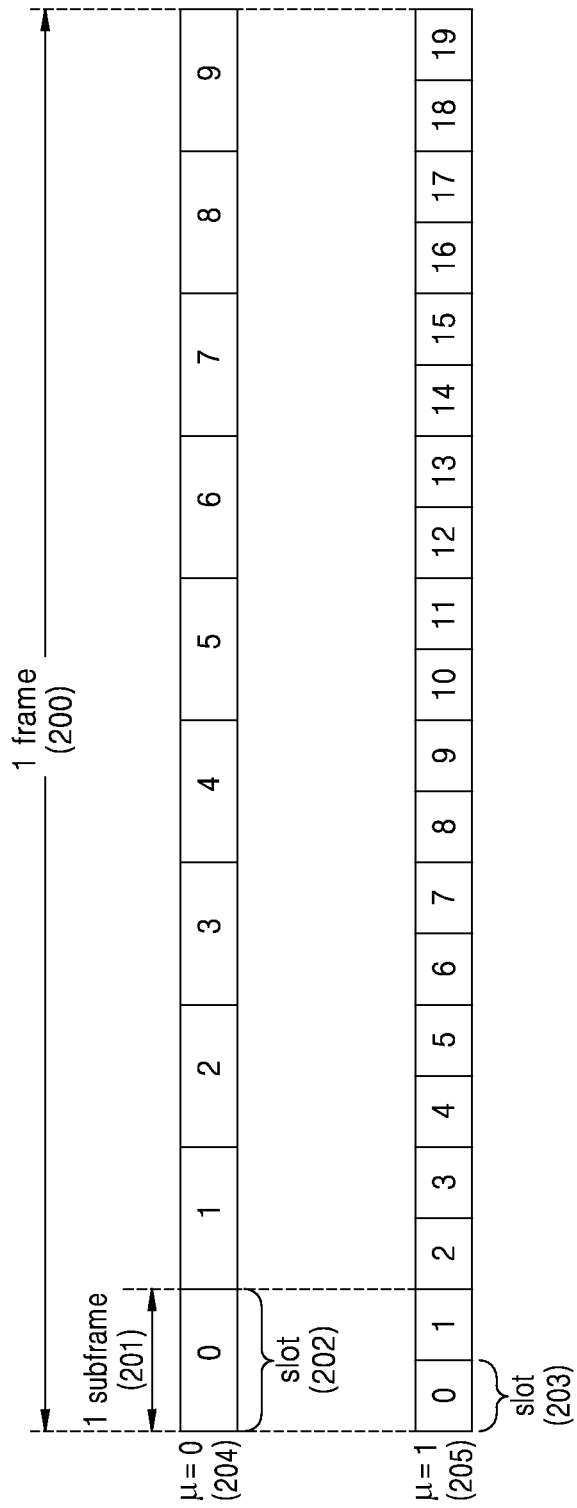
FIG. 2 illustrates a structure of a frame, a subframe, and a slot in 5G, according to an embodiment of the disclosure.

FIG. 2 illustrates a structure of a slot considered in a 5G system, according to some embodiments of the disclosure.

FIG. 2 illustrates an example of structures of a frame 200, a subframe 201, and a slot 202. One frame 200 may be defined to be 10 ms. One subframe 201 may be defined to be 1 ms, and accordingly, one frame 200 may be composed of a total of 10 subframes 201. One slot 202 or 203 may be defined by 14 OFDM symbols (i.e., the number of symbols per slot $N_{symb}^{slot}$=14). One subframe 201 may be composed of one or more slots 202 and 203, and the number of slots 202 and 203 per subframe 201 may vary according to configuration values μ 204 and 205 for subcarrier spacing. In an example of FIG. 2, a case where μ=0 204 and μ=1 205 are shown as the configuration values for subcarrier spacing is illustrated. When μ=0 204, one subframe 201 may be composed of one slot 202, and when μ=1 205, one subframe 201 may be composed of two slots 203. That is, the number of slots per subframe $N_{slot}^{subframe,\mu}$ may vary depending on the configuration value μ for subcarrier spacing, and accordingly, the number of slots per frame $N_{slot}^{frame,\mu}$ may vary. $N_{slot}^{subframe,\mu}$ and $N_{slot}^{frame,\mu}$ according to the configuration μ for each subcarrier spacing may be defined as Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Next, configuration of a bandwidth part (BWP) in a 5G communication system will be described in detail with reference to the accompanying drawings.

Figure 3:
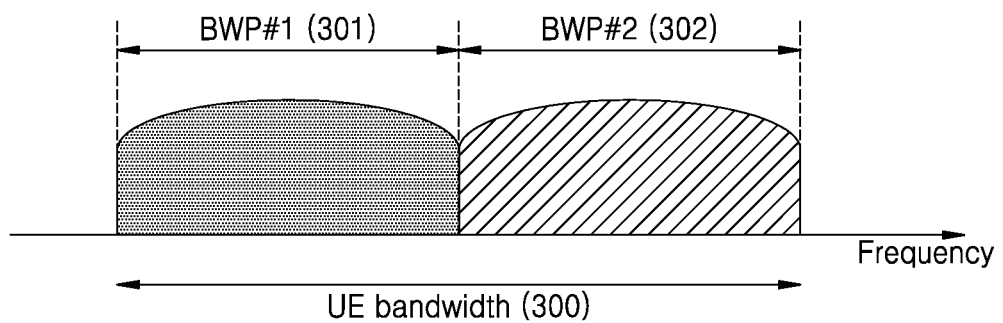
FIG. 3 illustrates an example of a configuration of a bandwidth part in 5G, according to some embodiments of the disclosure.

FIG. 3 illustrates an example of a configuration of a BWP in a 5G communication system, according to some embodiments of the disclosure.

FIG. 3 illustrates an example in which a UE bandwidth 300 is configured with two BWPs, i.e., a BWP #1 301 and a BWP #2 302. A BS may configure one or more BWPs to a UE and may configure the following information with respect to each of the BWPs.

TABLE 2

| BWP ::= | SEQUENCE { |
|---|---|
| bwp-Id | BWP-Id, |
| locationAndBandwidth | INTEGER (1..65536), |
| subcarrierSpacing | ENUMERATED (n0, n1, n2, n3, n4, n5), |
| cyclicPrefix | ENUMERATED ( extended ) |
| } | |

However, the disclosure is not limited to the above examples, and various parameters related to the BWPs as well as the configuration information may be configured to the UE. The BS may transmit the information to the UE through higher layer signaling, e.g., radio resource control (RRC) signaling. At least one of the one or more configured BWPs may be activated. Activation or deactivation with respect to the configured BWP may be semi-statically transmitted from the BS to the UE through RRC signaling or may be dynamically transmitted through downlink control information (DCI).

According to some embodiments, the UE prior to RRC connection may be configured with an initial BWP for initial access by the BS through a master information block (MIB).

In more detail, the UE may receive configuration information for a control resource set (CORESET) and a search space, in which a physical downlink control channel (PDCCH) for reception of system information (which may correspond to remaining system information (RMSI) or system information block 1 (SIB1)) required for initial access is transmittable, through the MIB in an initial access operation. The CORESET and the search space configured through the MIB may each be considered as an identity (ID) 0. The BS may notify the UE of configuration information, such as frequency assignment information, time assignment information, and numerology for CORESET #0, through the MIB. Also, the BS may notify the UE of configuration information for a monitoring period and occasion of the CORESET #0, i.e., configuration information for a search space #0 through the MIB. The UE may regard a frequency domain configured to the CORESET #0 obtained from the MIB, as an initial BWP for initial access. In this regard, an ID of the initial BWP may be regarded as 0.

Configuration of BWPs supported by the 5G system may be used for various purposes.

According to some embodiments, in a case where a bandwidth supported by the UE is narrower than a system bandwidth, configuration of the BWP may support this problem. For example, a frequency position (configuration information 2) of a BWP is configured to the UE, so that the UE may transmit or receive data at a particular frequency position within the system bandwidth.

According to some embodiments, the BS may configure a plurality of BWPs to the UE so as to support different numerologies. For example, in order to support both data transmission and reception using a subcarrier spacing of 15 kHz and a subcarrier spacing of 30 kHz, two BWPs may be configured with subcarrier spacings of 15 kHz and 30 kHz, respectively. Different BWPs may be frequency division multiplexed, and in a case where data is to be transmitted and received at a particular subcarrier spacing, a BWP configured with the corresponding subcarrier spacing may be activated.

According to some embodiments, the BS may configure BWPs having different bandwidths to the UE so as to reduce power consumption of the UE. For example, in a case where the UE supports a very large bandwidth, e.g., a bandwidth of 100 MHz, and data is always transmitted and received over the corresponding bandwidth, very large power consumption may occur. In particular, in a situation without traffic, performing monitoring on an unnecessary DL control channel over a large bandwidth of 100 MHz may be very inefficient in terms of power consumption. In order to reduce power consumption of the UE, the BS may configure, to the UE, a BWP of a relatively small bandwidth, e.g., a BWP of 20 MHz. In a situation without traffic, the UE may perform monitoring in the BWP of 20 MHz, and when data occurs, the UE may transmit and receive data over the bandwidth of 100 MHz according to indication by the BS.

In a method of configuring the BWP, UEs prior to RRC connection may receive configuration information for an initial BWP through the MIB in the initial access operation. In more detail, the UE may be configured with a CORESET for a DL control channel through which DCI scheduling an SIB is transmittable, through an MIB of a physical broadcast channel (PBCH). A bandwidth of the CORESET configured through the MIB may be regarded as an initial BWP, and the UE may receive a physical downlink shared channel (PDSCH) through which the SIB is transmitted, through a configured initial BWP. In addition to the purpose of receiving the SIB, the initial BWP may be used for other system information (OSI), paging, random access, or the like.

Next, a synchronization signal (SS)/PBCH block in the 5G system will be described below.

The SS/PBCH block may mean a physical layer channel block composed of a primary SS (PSS), a secondary SS (SSS), and a PBCH. A detailed description thereof is as follows.

PSS: The PSS is a signal that serves as a reference for DL time/frequency synchronization and provides some information of a cell ID.

SSS: The SSS serves as a reference for DL time/frequency synchronization and provides remaining information of the cell ID, which is not provided by the PSS. In addition, the SSS may serve as a reference signal for demodulation of the PBCH.

PBCH: The PBCH provides essential SI required for transmission and reception of a data channel and a control channel of the UE. The essential SI may include search space-related control information indicating radio resource mapping information of a control channel, scheduling control information for a separate data channel transmitting SI, etc.

SS/PBCH block: The SS/PBCH block is composed of a combination of a PSS, an SSS, and a PBCH. One or more SS/PBCH blocks may be transmitted within a period of 5 ms, and each of the transmitted SS/PBCH blocks may be identified by an index.

The UE may detect the PSS and SSS and decode the PBCH in the initial access operation. The UE may obtain the MIB from the PBCH and may be configured with a CORESET #0 therefrom. The UE may perform monitoring on the CORESET #0 assuming that a demodulation reference signal (DMRS) transmitted in a selected SS/PBCH block and the CORESET #0 is quasi co-located (QCL). The UE may receive SI as DL control information transmitted from the CORESET #0. The UE may obtain, from the received SI, configuration information related to a random access channel (RACH) required for initial access. The UE may transmit a physical RACH (PRACH) to the BS in consideration of an index of the selected SS/PBCH block, and the BS having received the PRACH may obtain information about the index of the SS/PBCH block selected by the UE. The BS may determine that the UE has selected a block from among the SS/PBCH blocks and monitors a CORESET #0 associated therewith.

Next, DCI in the 5G system will be described in detail.

In the 5G system, scheduling information for UL data (or physical uplink shared channel (PUSCH)) or DL data (or PDSCH) is transmitted from the BS to the UE through DCI. The UE may perform monitoring on a fallback DCI format and a non-fallback DCI format for the PUSCH or the PDSCH. The fallback DCI format may include a fixed field pre-defined between the BS and the UE, and the non-fallback DCI format may include a configurable field.

The DCI may be transmitted through a PDCCH through a channel coding and modulating process. A cyclic redundancy check (CRC) is attached to a DCI message payload, and the CRC may be scrambled by a radio network temporary identifier (RNTI) corresponding to an identity of the UE. Different RNTIs may be used depending on a purpose of a DCI message, for example, UE-specific data transmission, a power control command, or a random access response. That is, the RNTI is not explicitly transmitted, but is included in a CRC calculation process and then transmitted. Upon receiving the DCI message transmitted on the PDCCH, the UE may identify the CRC by using an assigned RNTI, and when a result of identifying the CRC is correct, the UE may determine that the corresponding message is transmitted to the UE.

For example, DCI scheduling a PDSCH for SI may be scrambled by an SI-RNTI. DCI scheduling a PDSCH for a random access response (RAR) message may be scrambled by a random access (RA)-RNTI. DCI scheduling a PDSCH for a paging message may be scrambled by a paging (P)-RNTI. DCI notifying a slot format indicator (SFI) may be scrambled by an SFI-RNTI. DCI notifying transmit power control (TPC) may be scrambled by a TPC-RNTI. DCI scheduling a UE-specific PDSCH or PUSCH may be scrambled by a cell (C)-RNTI.

A DCI format 0_0 may be used as fallback DCI scheduling a PUSCH, and in this regard, a CRC may be scrambled by a C-RNTI. The DCI format 0_0 of which the CRC is scrambled by the C-RNTI may include, for example, the following information.

TABLE 3

- Identifier for DCI formats - [1] bit
- Frequency domain resource assignment - $[\lceil \log_2(N_{RB}^{UL,BWP}(N_{RB}^{UL,BWP} + 1)/2) \rceil]$ bits
- Time domian resource assignment - X bits
- Frequency hopping flag - 1 bit
- Modulation and coding scheme - 5 bits
- New data indicator - 1 bit
- Redundancy version - 2 bits
- HARQ process number - 4 bits
- TPC command for scheduled PUSCH - [2] bits
- UL/SUL indicator - 0 or 1 bit A DCI format 0_1 may be used as non-fallback DCI scheduling a PUSCH, and in this regard, a CRC may be scrambled by a C-RNTI. The DCI format 0_1 of which the CRC is scrambled by the C-RNTI may include, for example, the following information.

TABLE 4

- Carrier indicator- 0 or 3 bits
- UL/SUL indicator - 0 or 1 bit
- Identifier for DCI formats - [1] bits
- Bandwidth part indicator - 0, 1 or 2 bits
- Frequency domain resource assignment
    - For resource allocation type 0, $\lceil N_{RB}^{UL,BWP}/P \rceil$ bits
    - For resource allocation type 1, $\lceil \log_2(N_{RB}^{UL,BWP}(N_{RB}^{UL,BWP} + 1)/2) \rceil$ bits
- Time domain resource assignment – 1, 2, 3, or 4 bits
- VRB-to-PRB mapping - 0 or 1 bit, only for resource allocation type 1.
    - 0 bit if only resource allocation type 0 is configured;
    - 1 bit otherwise.
- Frequency hopping flag - 0 or 1 bit, only for resource allocation type 1.
    - 0 bit if only resource allocation type 0 is configured;
    - 1 bit otherwise.
- Modulation and coding scheme - 5 bits
- New data indicator - 1 bit
- Redundancy version - 2 bits
- HARQ process number - 4 bits
- 1st downlink assignment index- 1 or 2 bits
    - 1 bit for semi-static HARQ-ACK codebook;
    - 2 bits for dynamic HARQ-ACK codebook with single HARQ-ACK codebook.
- 2nd downlink assignment index- 0 or 2 bits
    - 2 bits for dynamic HARQ-ACK codebook with two HARQ-ACK sub-codebooks;
    - 0 bit otherwise.
- TPC command for scheduled PUSCH - 2 bits
- SRS resource indicator -

$$\left\lceil \log_2\left(\sum_{k=1}^{L_{max}} \binom{N_{SRS}}{k}\right)\right\rceil \text{ or } \lceil \log_2(N_{SRS}) \rceil \text{ bits}$$

- $$\left\lceil \log_2\left(\sum_{k=1}^{L_{max}} \binom{N_{SRS}}{k}\right)\right\rceil$$

bits for non-codebook based PUSCH transmission;
  - $\lceil \log_2(N_{SRS}) \rceil$ bits for codebook based PUSCH transmission.
- Precoding information and number of layers-up to 6 bits
- Antenna ports - up to 5 bits
- SRS request - 2 bits
- CSI request- 0, 1, 2, 3, 4, 5, or 6 bits
- CBG transmission information- 0, 2, 4, 6, or 8 bits
- PTRS-DMRS association- 0 or 2 bits.
- beta_offset indicator- 0 or 2 bits
- DMRS sequence initialization- 0 or 1 bit A DCI format 1_0 may be used as fallback DCI scheduling a PDSCH, and in this regard, a CRC may be scrambled by a C-RNTI. The DCI format 1_0 of which the CRC is scrambled by the C-RNTI may include, for example, the following information.

TABLE 5

Identifier for DCI formats - [1] bit
Frequency domain resource assignment -[$\lceil \log_2(N_{RB}^{DL,BWP}(N_{RB}^{DL,BWP} + 1)/2) \rceil$ ] bits
Time domian resource assignment - X bits
VRB-toPRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator - 3 bits
PDSCH-to-HARQ feedback timing indicator - [3] bits A DCI format 1_1 may be used as non-fallback DCI scheduling a PDSCH, and in this regard, a CRC may be scrambled by a C-RNTI. The DCI format 1_1 of which the CRC is scrambled by the C-RNTI may include, for example, the following information.

TABLE 6

Carrier indicator - 0 or 3 bits
Identifier for DCI formats - [1] bit
Bandwidth part indicator - 0, 1 or 2 bits
Frquency domain resource assignment
    For resource allocation type 0, [$N_{RB}^{DL,BWP}/P$] bits
    For resource allocation tpye 1, [$\log_2(N_{RB}^{DL,BWP}(N_{RB}^{DL,BWP} + 1)/2)$] bits
Time domain resource assignment -1, 2, 3, or 4 bits
VRB-to-PRB mapping - 0 or 1 bit, only for resource allocation type 1.
    0 bit if only resource allocation type 0 is configured;
    1 bit otherwise
PRB bundling size indicator - 0 or 1 bit
Rate matching indicator - 0, 1, or 2 bits
ZP CSI-RS trigger - 0, 1, or 2 bits
For transport block 1:
    Modulation and coding scheme - 5 bits
    New data indicator - 1 bit
    Redundancy version - 2 bits TABLE 6-continued For transport block 2:
    Modulation and coding scheme - 5 bits
    New data indicator - 1 bit
    Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indicate - 0 or 3 bits
SRS request - 2 bits
CBG transmission information - 0, 2, 4, 6, or 8 bits
CBS flushing out information - 0 or 1 bit
DMRS sequence initialization - 1 bit Hereinbelow, a DL control channel in the 5G communication system will be described in more detail with reference to the accompanying drawings.

Figure 4:
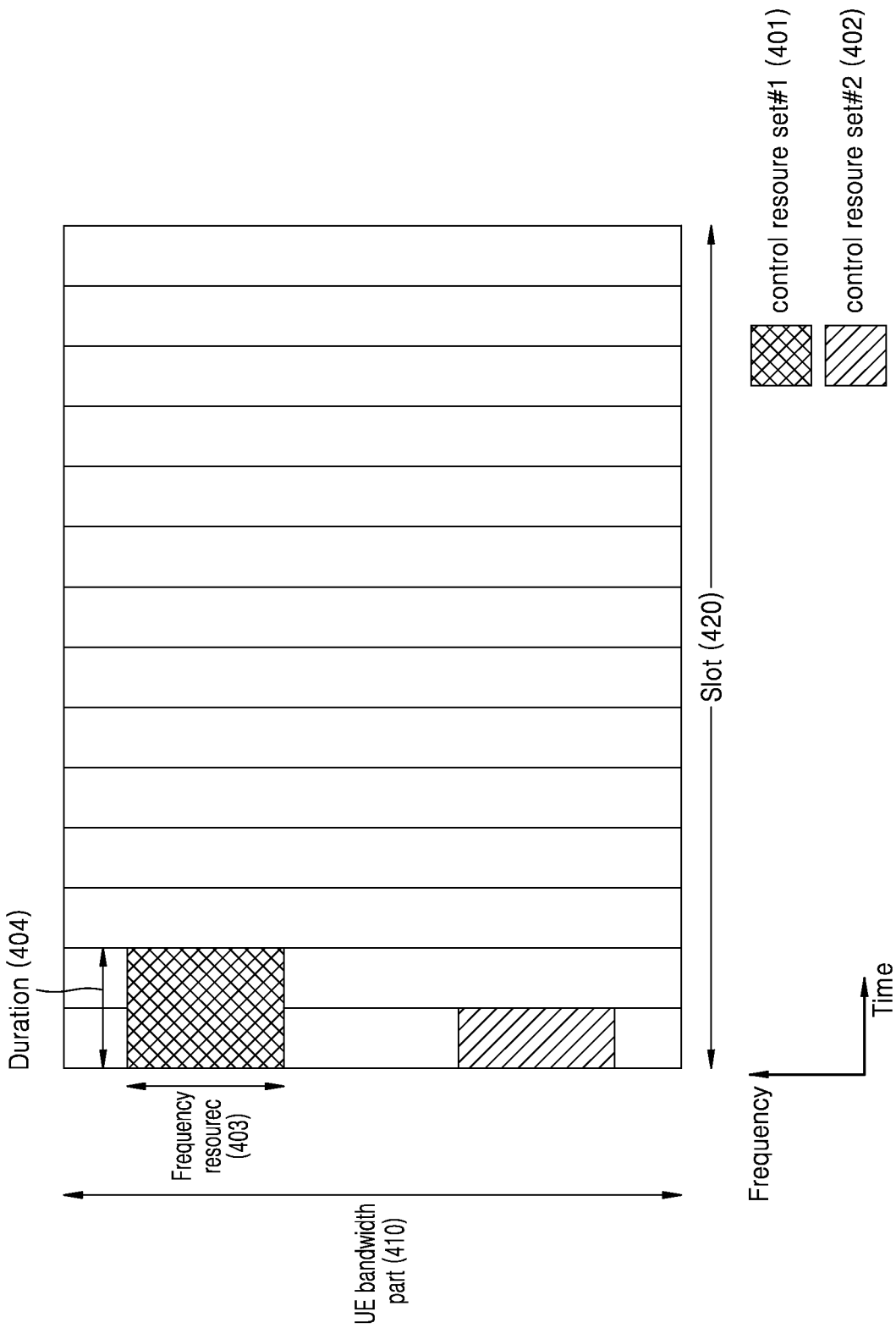
FIG. 4 illustrates an example of a configuration of a control region of a downlink control channel in 5G, according to some embodiments of the disclosure.

FIG. 4 illustrates an example of a CORESET through which a DL control channel is transmitted in a 5G wireless communication system, according to some embodiments of the disclosure.

FIG. 4 illustrates an example in which a UE bandwidth part 410 is configured on a frequency axis and two CORESETs (control resource set #1 401 and control resource set #2 402) are configured in one slot 420 on a time axis. The control resource set #1 401 and the control resource set #2 402 may be configured to a particular frequency resource 403 within an entire UE bandwidth part 410 on the frequency axis. The control resource set #1 401 and the control resource set #2 402 may be configured with one or more OFDM symbols on the time axis, and this may be defined as a CORESET duration 404. Referring to the example shown in FIG. 4, the control resource set #1 401 is configured with a CORESET duration of two symbols, and the control resource set #2 402 is configured with a CORESET duration of one symbol.

The BS may configure the above-described CORESET in the 5G system to the UE through higher layer signaling (e.g., SI, MIB, or RRC signaling). Configuring the CORESET to the UE means providing information such as an ID of the CORESET, a position of a frequency of the CORESET, or a symbol length of the CORESET. For example, the following information may be included.

TABLE 7

```
ControlResourceSet ::=                    SEQUENCE {
 -- Corresponds to L1 parameter 'CORESET-ID'
   controlResourceSetId                   ControlResourceSetId,
   frequencyDomainResource                BIT STRING (SIZE (45)),
   duration                               INTEGER (1..maxCoReSetDuration),
   (Time axis resource assignment information)
   cce-REG-MappingType                    CHOICE {
      interleaved                         SEQUENCE {
         reg-BundleSize                   ENUMERATED (n2, n3, n6),
         precoderGranularity              ENUMERATED      (sameAsREG-
   bundle, allContiguousRBs),
         interleaverSize                  ENUMERATED (n2, n3, n6)
         shiftIndex
         INTERGER(0..maxNrofPhysicalResourceBlocks−1)
         ( Interleaver Shift)
      },
      nonInterleaved                      NULL
   },
   tci-StatesPDCCH                        SEQUENCE(SIZE     (1..maxNrofTCI-
      StatesPDCCH)) OF TCI-StateId                   OPTIONAL,
      (QCL configuration information)
   tci-PresentInDCI                       ENUMERATED (enabled)
}
```

In Table 7, tci-StatesPDCCH (simply referred to as TCI state) configuration information may include information for an index of one or more SS/PBCH blocks, which are quasi co-located (QCL) with a DMRS transmitted from a corresponding CORESET, or an index of a channel state information reference signal (CSI-RS).

Figure 5:
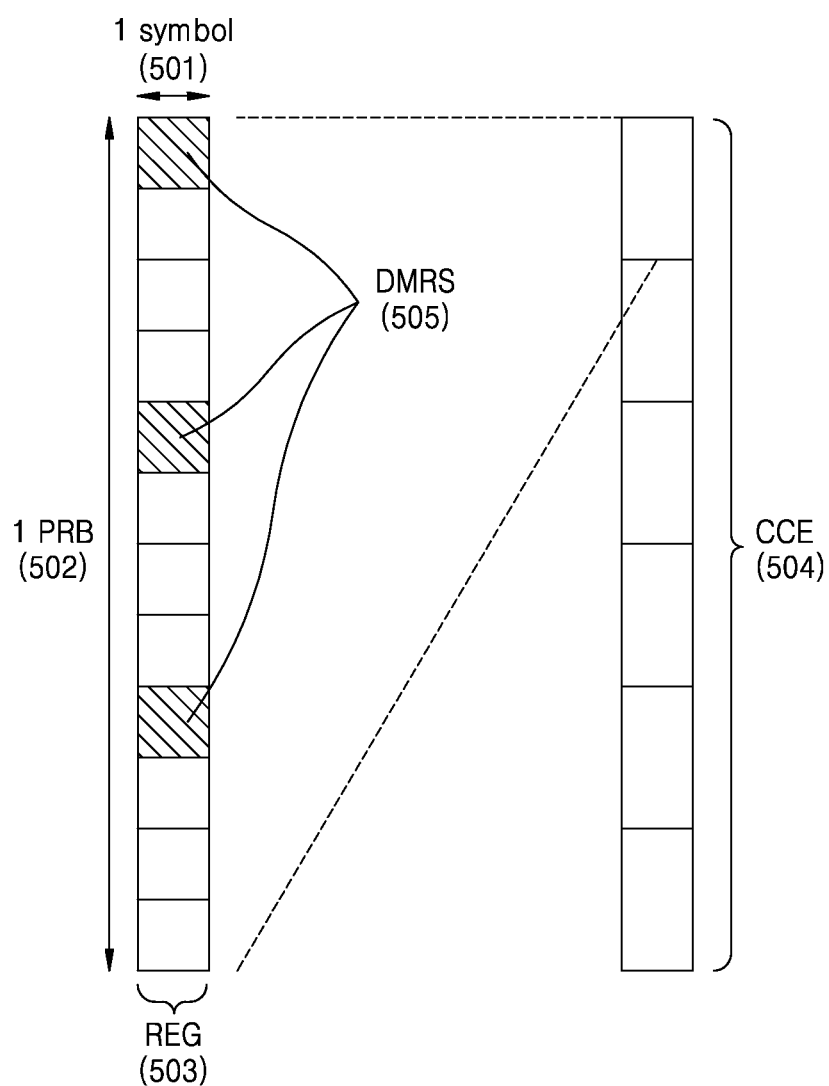
FIG. 5 illustrates a structure of a downlink control channel in 5G, according to some embodiments of the disclosure.

FIG. 5 illustrates an example of a base unit of a time and frequency resource configuring a DL control channel that is usable in 5G, according to some embodiments of the disclosure.

Referring to FIG. 5, a base unit of a time and frequency resource configuring a control channel may be referred to as a resource element group (REG) 503, and the REG 503 may be defined as one OFDM symbol 501 on a time axis and one physical resource block (PRB), i.e., 12 subcarriers, on a frequency axis. The BS may configure a DL control channel assignment unit by concatenating the REG 503.

As shown in FIG. 5, when a base unit into which the DL control channel is assigned in 5G is a control channel element (CCE) 504, one CCE 504 may be composed of a plurality of REGs 503. In the example shown in FIG. 5, when the REG 503 is composed of 12 REs and one CCE 504 is composed of 6 REGs 304, one CCE 504 may be composed of 72 REs. When a DL CORESET is configured, the corresponding CORESET may be composed of a plurality of CCEs 504, and a particular DL control channel may be mapped to one or more CCEs 504 according to an aggregation level (AL) in the CORESET and be transmitted. The CCEs 504 in the CORESET are identified by numbers, and in this regard, the numbers of the CCEs 504 may be assigned according to a logical mapping scheme.

The base unit of the DL control channel shown in FIG. 5, i.e., the REG 503, may include all regions where REs to which DCI is mapped and DMRSs 505 which are reference signals for decoding the same are mapped. As shown in FIG. 5, three DMRSs 505 may be transmitted in one REG 503. The number of CCEs required to transmit PDCCH may be 1, 2, 4, 8, or 16 depending on the AL, and different numbers of CCEs may be used to implement link adaptation of the DL control channel. For example, when AL=L, one DL control channel may be transmitted through L CCEs. The UE needs to detect a signal in a state in which information about the DL control channel is not known, and a search space representing a set of CCEs is defined for blind decoding. The search space is a set of DL control channel candidates including CCEs on which the UE needs to perform decoding on a given AL, and the UE may include a plurality of search spaces because there are several ALs forming one group with 1, 2, 4, 8, or 16 CCEs. A search space set may be defined as a set of search spaces on all configured ALs.

The search spaces may be classified into a common search space and a UE-specific search space. A certain group of UEs or all the UEs may search a common search space of the PDCCH in order to receive cell-common control information such as a paging message or dynamic scheduling for SI. For example, PDSCH scheduling assignment information for transmission of an SIB including cell operator information, etc. may be received by searching the common search space of the PDCCH. The common search space may be defined as a set of pre-appointed CCEs because a certain group of UEs or all the UEs need to receive the PDCCH. Scheduling assignment information for a UE-specific PDSCH or PUSCH may be received by searching a UE-specific search space of the PDCCH. The UE-specific search space may be UE-specifically defined as a function of an identity of the UE and various system parameters.

In 5G, parameters for the search spaces of the PDCCH may be configured by the BS to the UE through higher layer signaling (e.g., SIB, MIB, or RRC signaling). For example, the BS may configure, to the UE, the number of PDCCH candidates at each AL L, a monitoring period for the search space, a monitoring occasion in a symbol unit within a slot for the search space, a search space type (common search space or UE-specific search space), a combination of a DCI format and an RNTI to be monitored in the search space, an index of a CORESET to monitor the search space, etc. For example, the following information may be included.

TABLE 8

```
SearchSpace ::=               SEQUENCE {
  -- Identity of the search space, SearchSpaceId = 0 identifies the
    SearchSpace configured via PBCH (MIB) or ServingCellConfigCommon.
  searchSpaceId                    SearchSpaceId,
  controlResourceSetId             ControlResourceSetId,
  monitoringSlotPeriodicityAndOffset     CHOICE {
    sl1                              NULL,
    sl2                              INTEGER (0..1),
    sl4                              INTEGER (0..3),
    sl5                        INTEGER (0..4),
    sl8                              INTEGER (0..7),
    sl10                             INTEGER (0..9),
    sl16                             INTEGER (0..15),
    sl20                             INTEGER (0..19)
  }
  duration (Monitoring duration)    INTEGER (2..2559)
  monitoringSymbolsWithinSlot            BIT STRING (SIZE (14))
  nrofCandidates                   SEQUENCE {
    (Number of PDCCH candidates for each aggregation level)
    aggregationLevel1             ENUMERATED (n0, n1, n2, n3, n4,
    n5, n6, n8),
    aggregationLevel2             ENUMERATED (n0, n1, n2, n3, n4,
    n5, n6, n8),
    aggregationLevel4             ENUMERATED (n0, n1, n2, n3, n4,
    n5, n6, n8),
    aggregationLevel8             ENUMERATED (n0, n1, n2, n3, n4,
    n5, n6, n8),
    aggregationLevel16                  ENUMERATED (n0, n1, n2, n3,
    n4, n5, n6, n8),
  },
```

TABLE 8-continued

```
searchSpaceType                    CHOICE {
  -- Configures this search space as common search space (CSS) and
  DCI formats to monitor.
  common                           SEQUENCE {
  (Common search space)
  }
  ue-Specific                      SEQUENCE {
  (UE-specific search space)
    -- Indicates whether the UE monitors in this USS for DCI
  formats 0-0 and 1-0 or for formats 0-1 and 1-1,
    formats                        ENUMERATED     (formats0-0-And-
  1-0, formats0-1-And-1-1),
    ...
  }
}
```

The BS may configure one or more search space sets to the UE according to configuration information. According to some embodiments, the BS may configure a search space set #1 and a search space set #2 to the UE and may configure a DCI format A scrambled by an X-RNTI in the search space set #1 to be monitored in the common search space and a DCI format B scrambled by a Y-RNTI in the search space set #2 to be monitored in the UE-specific search space.

According to the configuration information, the common search space or the UE-specific search space may include one or more search space sets. For example, the search space set #1 and the search space set #2 may be configured as common search spaces, and a search space set #3 and a search space set #4 may be configured as UE-specific search spaces.

In the common search space, the following combinations of DCI formats and RNTIs may be monitored. However, the disclosure is not limited to examples below.

DCI format 0_0/1_0 with CRC scrambled by C-RNTI, configured scheduling RNTI (CS-RNTI), semi-persistent channel state information RNTI (SP-CSI-RNTI), RA-RNTI, temporary cell RNTI (TC-RNTI), P-RNTI, SI-RNTI DCI format 2_0 with CRC scrambled by SFI-RNTI DCI format 2_1 with CRC scrambled by interruption RNTI (INT-RNTI)

DCI format 2_2 with CRC scrambled by TPC-PUSCH-RNTI, TPC-physical uplink control channel (PUCCH)-RNTI DCI format 2_3 with CRC scrambled by TPC-sounding reference signal (SRS)-RNTI In the UE-specific search space, the following combinations of DCI formats and RNTIs may be monitored. However, the disclosure is not limited to examples below.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The specified RNTIs may follow the definitions and uses below.

C-RNTI: For scheduling UE-specific PDSCH
TC-RNTI: For scheduling UE-specific PDSCH
CS-RNTI: For scheduling semi-statically configured UE-specific PDSCH
RA-RNTI: For scheduling PDSCH in a random access operation
P-RNTI: For scheduling PDSCH on which paging is transmitted
SI-RNTI: For scheduling PDSCH on which SI is transmitted
INT-RNTI: For notifying whether PDSCH is punctured
TPC-PUSCH-RNTI (TPC for PUSCH RNTI): For indicating a power control command for PUSCH
TPC-PUCCH-RNTI (TPC for PUCCH RNTI): For indicating a power control command for PUCCH
TPC-SRS-RNTI (TPC for SRS RNTI): For indicating a power control command for SRS The specified DCI formats described above may follow the definitions below.

TABLE 9

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, a search space of an AL L in a CORESET p and a search space set s may be represented by Equation 1 below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \bmod \lfloor N_{CCE,p}/L \rfloor \right\} + i \quad \text{[Equation 1]}$$

$L : AL$ $n_{CI}$ : Carrier index $N_{CCE,p}$ : Total number of CCEs present in CORESET $p$ $n_{s,f}^\mu$ : Slot index $M^{(L)}{}_{p,s,max}$ : Number of PDCCH candidate groups of AL L $m_{s,n_{CI}} = 0, \dots ,$ $M^{(L)}{}_{p,s,max} - 1$ : index of PDCCH candidate group of AL L $i = 0, \dots , L - 1$ $T_{p,n_{s,f}^\mu} = \left( A_p \cdot Y_{p,n_{s,f}^\mu - 1} \right) \bmod D, \; Y_{p,-1} = n_{RNTI} \neq 0,$ $A_0 = 39827, A_0 = 39829, A_2 = 39839$ $n_{RNTI} : UE\ ID$ In a case of the common search space, a value of $Y\_(p,n^\mu{}_{s,f})$ may correspond to 0.

In a case of the UE-specific search space, the value of $Y\_(p,n^\mu{}_{s,f})$ may correspond to a value that changes according to an identity (e.g., C-RNTI or ID configured by the BS to the UE) of the UE and a time index.

In 5G, a plurality of search space sets may be configured with different parameters (e.g., the parameters in Table 8), and thus a set of search space sets monitored by the UE may vary at each point in time. For example, when the search space set #1 is configured with an X-slot duration, the search space set #2 is configured with a Y-slot duration, and X and Y are different from each other, the UE may monitor both the search space set #1 and the search space set #2 in a particular slot and may monitor one of the search space set #1 and the search space set #2 in another particular slot.

When the search space sets are configured to the UE, the following conditions may be considered in a method of determining a search space set which needs to be monitored by the UE.

[Condition 1: Limitation on the Maximum Number of PDCCH Candidates]

The number of PDCCH candidates that may be monitored per slot does not exceed $M^\mu$. $M^\mu$ may be defined as the maximum number of PDCCH candidates per slot in a cell configured with a subcarrier interval of $15 \cdot 2^\mu$ kHz and may be defined by Table 10 below.

TABLE 10

| μ | Maximum number of PDCCH candidates per slot and per serving cell ($M^\mu$) |
|---|---|
| 0 | 44 |
| 1 | 36 |
| 2 | 22 |
| 3 | 20 |

[Condition 2: Limitation on the Maximum Number of CCEs]

The number of CCEs configuring an entire search space per slot (where the entire search space refers to an entire CCE set corresponding to a union region of a plurality of search space sets) does not exceed $C^\mu$. $C^\mu$ may be defined as the maximum number of CCEs per slot in a cell configured with a subcarrier interval of $15 \cdot 2^\mu$ kHz and may be defined in Table 11 below.

TABLE 11

| μ | Maximum number of CCEs per slot and per serving cell ($C^\mu$) |
|---|---|
| 0 | 56 |
| 1 | 56 |
| 2 | 48 |
| 3 | 32 |

For convenience of explanation, a situation in which both the conditions 1 and 2 are satisfied at a particular point in time will be defined as "condition A". Accordingly, not satisfying the condition A may mean that at least one of the conditions 1 and 2 is not satisfied.

According to configurations of search space sets of the BS, a case where the condition A is not satisfied may occur at a particular point in time. When the condition A is not satisfied at a particular point in time, the UE may select and monitor only some of search space sets configured to satisfy the condition A at the corresponding point in time, and the BS may transmit a PDCCH to the selected search space sets.

A method of selecting some search spaces from among all of the configured search space sets may be performed as Method 1 below.

[Method 1]

When condition A for a PDCCH is not satisfied at a particular point in time (slot), the UE (or BS) may preferentially select a search space set of which a search space type is configured as a common search space, over a search space set configured as a UE-specific search space, from among search space sets present at the corresponding point in time.

When all search space sets configured as the common search spaces are selected (i.e., when the condition A is still satisfied even after all of the search spaces configured as the common search space are selected), the UE (or BS) may select search space sets configured as the UE-specific search spaces. In this regard, when there are a plurality of search space sets configured as the UE-specific search spaces, a search space set having a small search space set index may have a higher priority. In consideration of the priority, UE-specific search space sets may be selected within a range in which the condition A is satisfied.

In the 5G communication system, for the purpose of reducing power consumption of the UE, a method of controlling whether to monitor a PDCCH through layer 1 (L1) signaling is under discussion. Examples of the L1 signaling may include a signal indicating the UE to monitor the PDCCH (this is referred to as a wake-up signal (WUS)) or a signal indicating the UE not to monitor the PDCCH (this is referred to as a go-to-sleep signal (GTS)). For example, the BS may transmit a WUS to the UE, and the UE may monitor the PDCCH from a point in time after the WUS is detected. As another example, the BS may transmit a GTS to the UE, and the UE may not monitor the PDCCH from a point in time after the GTS is detected.

The aforementioned L1 signaling controlling a monitoring operation on the PDCCH is referred to as a "low power mode indicator". The BS may notify the UE of configuration information for the low power mode indicator, and the UE may monitor the low power mode indicator based on the notified configuration information for the low power mode indicator, and accordingly may control the monitoring operation on the PDCCH differently.

A method of transmitting and receiving L1 signaling for a low power operation of the UE and an operation performed by the UE according thereto will be provided herein. A cross-carrier indication method using L1 signaling will be described in greater detail.

Through a WUS transmission method, and a PDCCH monitoring method performed by the UE according thereto provided herein, power consumption of the UE due to PDCCH monitoring may be minimized.

Hereinbelow, embodiments of the disclosure will be described in detail with reference to the accompanying drawings. Hereinbelow, embodiments of the disclosure are described based on an example of 5G systems, but the embodiments of the disclosure may also be applied to other communication systems having similar technical backgrounds or channel types. For example, the other communication systems may include LTE or LTE-A mobile communication technology, and mobile communication technology developed after 5G. Therefore, embodiments of the disclosure may be applied to other communication systems through modifications at the discretion of one of ordinary skill in the art without greatly departing from the scope of the disclosure.

Also, when detailed descriptions about known functions or components associated with the disclosure are determined to unnecessarily obscure the gist of the disclosure, detailed descriptions thereof will be omitted. The terms as used herein are those defined by taking into account functions in the disclosure, but the terms may vary depending on the intention of users or those of ordinary skill in the art, precedents, or the like. Therefore, the definitions should be made based on the contents throughout the specification.

First Embodiment

In a first embodiment of the disclosure, a method of transmitting and receiving a low power mode indicator will be described. In further detail, methods for the BS to perform configuration required to transmit the low power mode indicator to the UE and notify the UE of configuration information, and methods for the UE to receive the configuration information for the low power mode indicator from the BS and monitor the low power mode indicator based on the configuration information will be described below.

Typically, the low power mode indicator may include the following signals or signals capable of performing the following functions.

WUS

This may correspond to a signal indicating the UE to monitor the PDCCH. For example, the BS may transmit a WUS to the UE, and the UE may monitor the PDCCH from a point in time after the WUS is detected.

GTS

This may correspond to a signal indicating the UE not to monitor the PDCCH. For example, the BS may transmit a GTS to the UE, and the UE may not monitor the PDCCH from a point in time after the GTS is detected.

PDCCH Monitoring Adaptation Signal (MAS)

This may correspond to a signal dynamically indicating the UE to monitor the PDCCH. For example, the BS may transmit a MAS to the UE, and after the MAS is detected, the UE may monitor the PDCCH according to a PDCCH configuration notified through the MAS. The MAS may include at least one parameter of information such as, for example, a PDCCH monitoring period, the number of times of blind decoding operations, a search space set index, etc.

Hereinbelow, the embodiments of the disclosure will be described in detail, by considering the low power mode indicator as the WUS, the GTS, and the MAS. The embodiments of the disclosure may be equally applied to all general low power mode indicators which perform the same function as the WUS, the GTS, and the MAS. Also, the following embodiments may be combined with each other.

1-1st Embodiment

Figure 6:
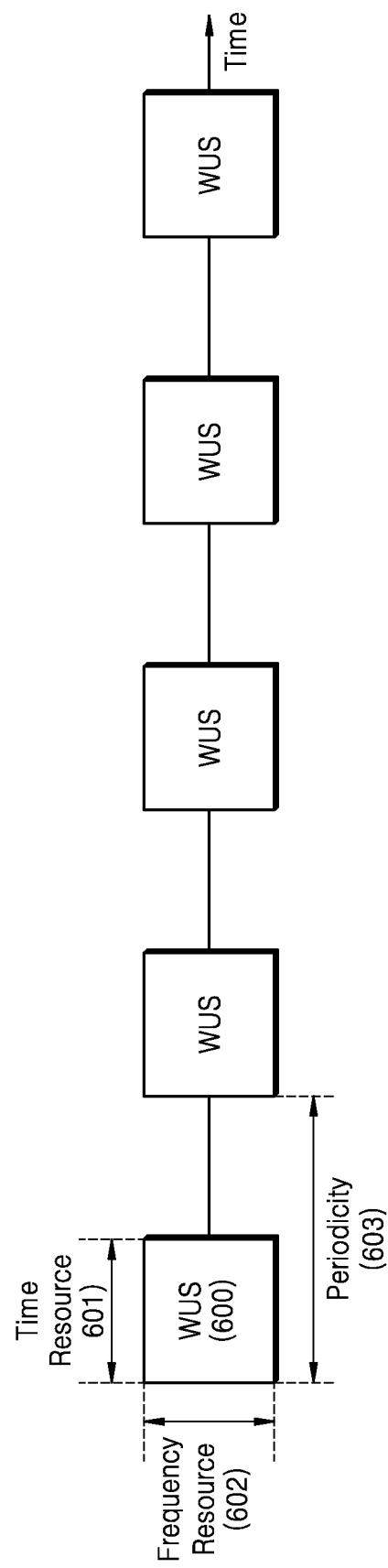
FIG. 6 illustrates an example of a wake-up signal (WUS) transmission method according to a 1-1st embodiment of the disclosure.

FIG. 6 illustrates a WUS transmission method according to a 1-1st embodiment of the disclosure.

The BS may configure, to the UE, a time resource 601, a frequency resource 602, and a transmission periodicity 603, in which a WUS 600 is transmitted, through higher layer signaling (e.g., MIB, SIB, or RRC signaling). The WUS 600 may be transmitted from the BS to the UE according to the configured time resource 601, frequency resource 602, and transmission periodicity 603, and a monitoring duration (or monitoring window). The WUS 600 may correspond to a pre-defined particular sequence, for example, one of a Zadoff-Chu (ZC) sequence, an m sequence, or a Gold sequence. However, the disclosure is not limited to the above examples.

Also, according to some embodiments of the disclosure, the WUS 600 may be UE-specifically defined. For example, a sequence corresponding to the WUS 600 may be determined by an ID (e.g., C-RNTI) of the UE or determined by a UE-specific ID configured by the BS to the UE. The UE may receive configuration information for the WUS 600 and may monitor the WUS 600, which is transmittable as the configured time resource 601 and frequency resource 602, at every configured periodicity 603.

The UE may be notified by the BS with configuration information about the time resource 601, frequency resource 602, and periodicity 603 for a WUS through higher layer signaling (e.g., MIB, SIB, or RRC signaling) and may monitor the WUS in the configured resources.

At least one of the following parameters may be configured for the WUS.

Figure 7:
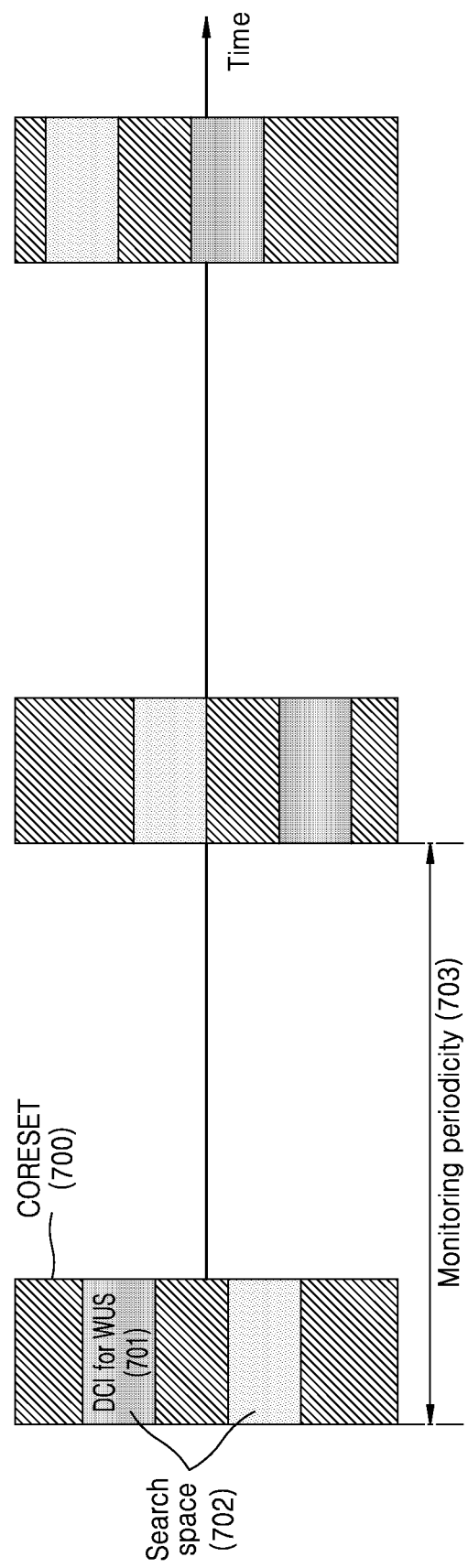
FIG. 7 illustrates an example of a WUS transmission method, according to a 1-2nd embodiment of the disclosure.

Time resource assignment information
Frequency resource assignment information
Monitoring period and monitoring occasion
Monitoring duration or monitoring window
Transmission configuration indicator (TCI) state, QCL configuration information
Sequence ID 1-2nd Embodiment FIG. 7 illustrates a WUS transmission method according to a 1-2nd embodiment of the disclosure.

Although shown as a WUS in FIG. 7, the embodiments of the disclosure may be equally applied to signals corresponding to all general low power mode indicators which perform the same function as the WUS. The BS may transmit DCI for WUS 701 to the UE.

As shown in FIG. 7, the BS may configure a CORESET 700 and a search space 702 for transmitting the DCI for WUS 701 to the UE.

1-2-1st Embodiment

A method for the BS to configure the CORESET 700 for transmitting the DCI for WUS 701 to the UE may be as follows.

The CORESET 700 through which the DCI for WUS 701 is transmittable may correspond to a CORESET (i.e., a CORESET with a CORESET ID of 0, or a CORESET #0) configured by the BS to the UE through an MIB. That is, the search space 702 for the DCI for WUS 701 may always be associated with the CORESET #0. A search space being associated with a CORESET means that the search space is defined in the associated CORESET (this may be configured by designating, as an ID of a CORESET to be associated, a value of a parameter ControlResourceSetId among RRC parameters (SearchSpace IE) for the search space in Table 8 described above.).

Alternatively, the CORESET 700 through which the DCI for WUS 701 is transmittable may be configured by the BS to the UE through higher layer signaling, for example, RRC signaling, and the parameters in Table 7 may be configured. That is, the search space 702 for the DCI for WUS 701 may always be associated with an arbitrary CORESET configured through RRC signaling.

Also, another method for the BS to configure the CORESET 700 for transmitting the DCI for WUS 701 to the UE may be as follows.

The CORESET 700 through which the DCI for WUS 701 is transmittable may be present only in a particular BWP. As an example, the CORESET 700 may be configured in an initial BWP which is configured through an MIB. Also, according to some embodiments of the disclosure, the CORESET 700 through which the DCI for WUS 701 is transmittable may be present in an initial BWP which is configured through an SIB. Also, according to some embodiments of the disclosure, the CORESET 700 through which the DCI for WUS 701 is transmittable may be present in a BWP corresponding to a default BWP, among BWPs which are configured through higher layer signaling, for example, RRC signaling. According to some embodiments of the disclosure, the default BWP may correspond to a BWP which is returned when the UE fails to detect DCI for a configured time (bwp-InactivityTimer) through higher layer signaling.

Moreover, according to some embodiments of the disclosure, the BS may configure, to the UE, a BWP to monitor the CORESET 700 in which the DCI for WUS 701 is transmittable, through higher layer signaling, for example, RRC signaling. That is, the search space 702 for the DCI for WUS 701 may always be associated with a CORESET present in a particular BWP.

Alternatively, the CORESET 700 through which the DCI for WUS 701 is transmittable may be present in each BWP. In other words, the search space 702 for the DCI for WUS 701 may be associated with a CORESET present in an arbitrary BWP which is configured through RRC signaling.

Also, another method for the BS to configure the CORESET 700 for transmitting the DCI for WUS 701 to the UE may be as follows.

The CORESET 700 through which the DCI for WUS 701 is transmittable may correspond to a CORESET configured as a common search space. That is, a search space type for the DCI for WUS 701 may be associated with a CORESET configured as a common search space.

Alternatively, the CORESET 700 through which the DCI for WUS 701 is transmittable may correspond to a CORESET configured as a UE-specific search space. In other words, a search space type for the DCI for WUS 701 may be associated with a CORESET configured as a UE-specific search space.

Moreover, another method for the BS to configure the CORESET 700 for transmitting the DCI for WUS 701 to the UE may be as follows.

Among configuration parameters of the CORESET 700 through which the DCI for WUS 701 is transmittable, a particular parameter may be configured to a particular value. For example, among parameters for the CORESET 700 shown in Table 7, precoderGranularity may be configured to allContiguousRBs (this may be understood that a DMRS of a CORESET is configured to a wideband reference signal (RS)). When precoderGranularity is configured to allContiguousRBs, the UE may assume that the same precoding is applied to all DMRSs transmitted from consecutive RBs in the CORESET.

1-2-2nd Embodiment

As shown in FIG. 7, the BS may configure a search space 702 for transmitting DCI for WUS 701 to the UE, through higher layer signaling (e.g., MIB, SIB, or RRC signaling). For example, the BS may configure the parameters for the search spaces described in Table 8 (i.e., a monitoring period and offset in units of slots, a monitoring occasion in units of symbols, the number of PDCCH candidate groups for each AL, a search space type, a DCI format, etc.).

In a method for the BS to configure, to the UE, the search space 702 to monitor a WUS, the BS may configure a search space type of a search space by using at least one of the following methods.

[Method 1]
The search space type may be configured as a common search space (CSS), and a value of $Y\_(p, n^\mu_{s,f})$ among parameters determining the search space may correspond to 0. That is, DCI for WUS may be transmitted to the common search space. The UE may monitor the DCI for WUS in the common search space.

[Method 2]
The search space type may be configured as a CSS or a group common search space (GCSS), and the value of $Y\_(p, n^\mu_{s,f})$ among the parameters determining the search space may be determined as a group common RNTI (e.g., a GC-RNTI). That is, the DCI for WUS may be transmitted from a group-commonly defined search space. The UE may monitor the DCI for WUS in the group common search space.

[Method 3]
The search space type may be configured as a UE-specific search space (USS), and the value of $Y\_(p, n^\mu_{s,f})$ may correspond to a value that changes according to an identity (e.g., C-RNTI or ID configured by the BS to the UE) of the UE and a time index. That is, the DCI for WUS may be transmitted from a UE-specifically defined search space. The UE may monitor the DCI for WUS in the UE-specific search space.

In a method for the BS to configure, to the UE, the search space 702 to monitor a WUS, the BS may configure a DCI format to be monitored in a search space by using at least one of the following methods.

[Method 1]
The BS may configure such that a particular DCI format (e.g., a DCI format 0-2 or 1-2, or DCI format 3) defined for the purpose of transmitting the WUS is monitored. A DCI format for WUS may be scrambled by a WUS-RNTI. The UE may receive the DCI format for WUS assuming that the DCI format for WUS is scrambled by the WUS-RNTI. That is, the DCI format for WUS may be descrambled by the WUS-RNTI.

[Method 2]
The BS may configure such that a DCI format 0-0 or 1-0 scrambled by an RNTI for WUS (e.g., WUS-RNTI) is monitored. When the UE is configured with the WUS-RNTI, the UE may monitor DCI scrambled by the WUS-RNTI for the DCI format 0-0 or 1-0.

[Method 3]
The BS may configure such that a DCI format 0-1 or 1-1 scrambled by the RNTI for WUS (e.g., WUS-RNTI) is monitored. When the UE is configured with the WUS-RNTI, the UE may monitor DCI scrambled by the WUS-RNTI for the DCI format 0-1 or 1-1.

Second Embodiment

In a second embodiment of the disclosure, a method of controlling activation and deactivation of each cell (or component carrier (CC)) by using a WUS in a carrier aggregation (CA)-based operating environment will be described.

The UE may receive configuration information for a plurality of cells from the BS, and the BS may indicate all or some of configured cells to be activated or deactivated, through higher layer signaling (e.g., a media access control (MAC) control element (CE)). The UE may perform CA on activated cells and communicate with the activated cells. A PDCCH notifying scheduling information for a particular cell may be transmitted from the same cell or may be transmitted from a different cell. In more detail, the following terms will be defined.

Self-Carrier Scheduling

An operation performed when a cell from which control information indicating scheduling for a data channel is transmitted and a cell from and to which the data channel scheduled by the corresponding control information is transmitted and received are identical to each other.

Cross-Carrier Scheduling

An operation performed when a cell from which control information indicating scheduling for a data channel is transmitted and a cell from and to which the data channel scheduled by the corresponding control information is transmitted and received are different from each other.

The UE may determine which cell scheduling information DCI detected through a carrier index indicator in the DCI corresponds to.

A UE operating using CA may consume a relatively greater amount of power compared to when operating using a single cell. For example, the UE operating using CA may monitor a PDCCH in each cell, and for this purpose, a radio frequency (RF) and a baseband (BB) unit need to operate for each cell, and thus power consumption may occur in proportion to the number of cells compared to a single cell. In particular, a case where the PDCCH is unnecessarily monitored even though there is no data scheduling performed in each cell may be undesirable in terms of power consumption of the UE. Accordingly, a method of controlling a PDCCH monitoring operation of each cell using a WUS will be described in embodiments of the disclosure.

The WUS may be transmitted only from some of configured or activated cells, and a WUS transmitted from a particular cell may control a PDCCH monitoring operation in another cell. According to the embodiments of the disclosure, until traffic occurs, that is, until scheduling occurs in cells operating by CA, the UE monitors only a WUS configured in a particular cell and does not perform PDCCH monitoring on other cells, thereby minimizing power consumption due to unnecessary PDCCH monitoring. According to some embodiments of the disclosure, in particular, when cells belonging to a low frequency band (below 6 GHz, frequency range 1 (FR1)) and a high frequency band (above 6 GHz, frequency range 2 (FR2)) are carrier-aggregated and operate, the effect may be maximized.

In general, a greater amount of power may be consumed for transmission and reception to and from a cell of the FR2, compared to transmission and reception to and from a cell of the FR1. Accordingly, it is very important to minimize power consumption of the UE in the RF and BB units, which occurs due to operation of a cell belonging to the FR2, by minimizing monitoring of the cell belonging to the FR2. For the above purpose, the WUS may be configured and transmitted from a cell belonging to the FR1, and while the UE monitors the WUS, the UE may deactivate (or turn off) all terminal devices and modules required for transmission and reception to and from the cell belonging to the FR2, thereby reducing the power consumption. The WUS transmitted from the cell belonging to the FR1 may indicate whether to activate the cell belonging to the FR2 or whether to monitor the PDCCH, and accordingly, the UE may selectively activate the terminal devices and modules for transmission and reception in the FR2 only when necessary.

Figure 8:
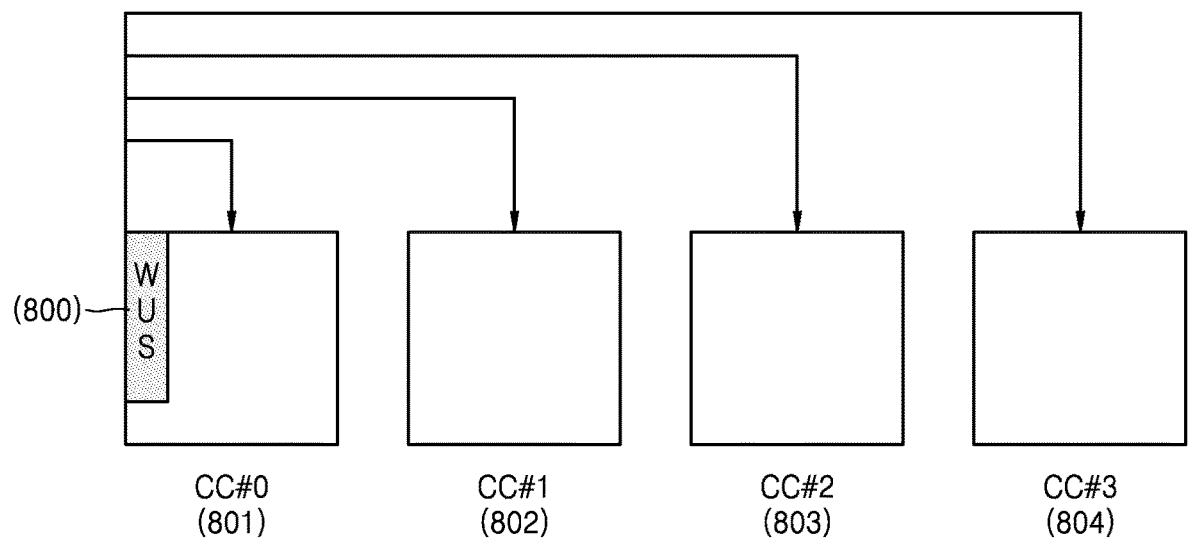
FIG. 8 illustrates a method of a WUS transmission and cross-carrier indication method, according to a second embodiment of the disclosure.

FIG. 8 illustrates a method of a WUS transmission and cross-carrier indication method, according to a second embodiment of the disclosure.

FIG. 8 illustrates an example in which a total of four cells (e.g., CC #0 801, CC #1 802, CC #2 803, and CC #3 804) operate by CA. A WUS 800 may be configured and transmitted from a particular cell (CC #0 801 in FIG. 8). The UE may perform monitoring on the WUS 800 in the cell for which the WUS 800 is configured. The WUS 800 transmitted from the particular cell may control not only monitoring of a PDCCH of the corresponding cell but also monitoring of a PDCCH on another cell operating by CA. That is, a WUS 800 detected in the CC #0 801 may control monitoring of PDCCHs in the CC #0 801, the CC #1 802, the CC #2 803, and the CC #3 804. Cells for which PDCCH monitoring is controlled by the WUS 800 are defined as cells associated with the WUS 800.

Figure 9:
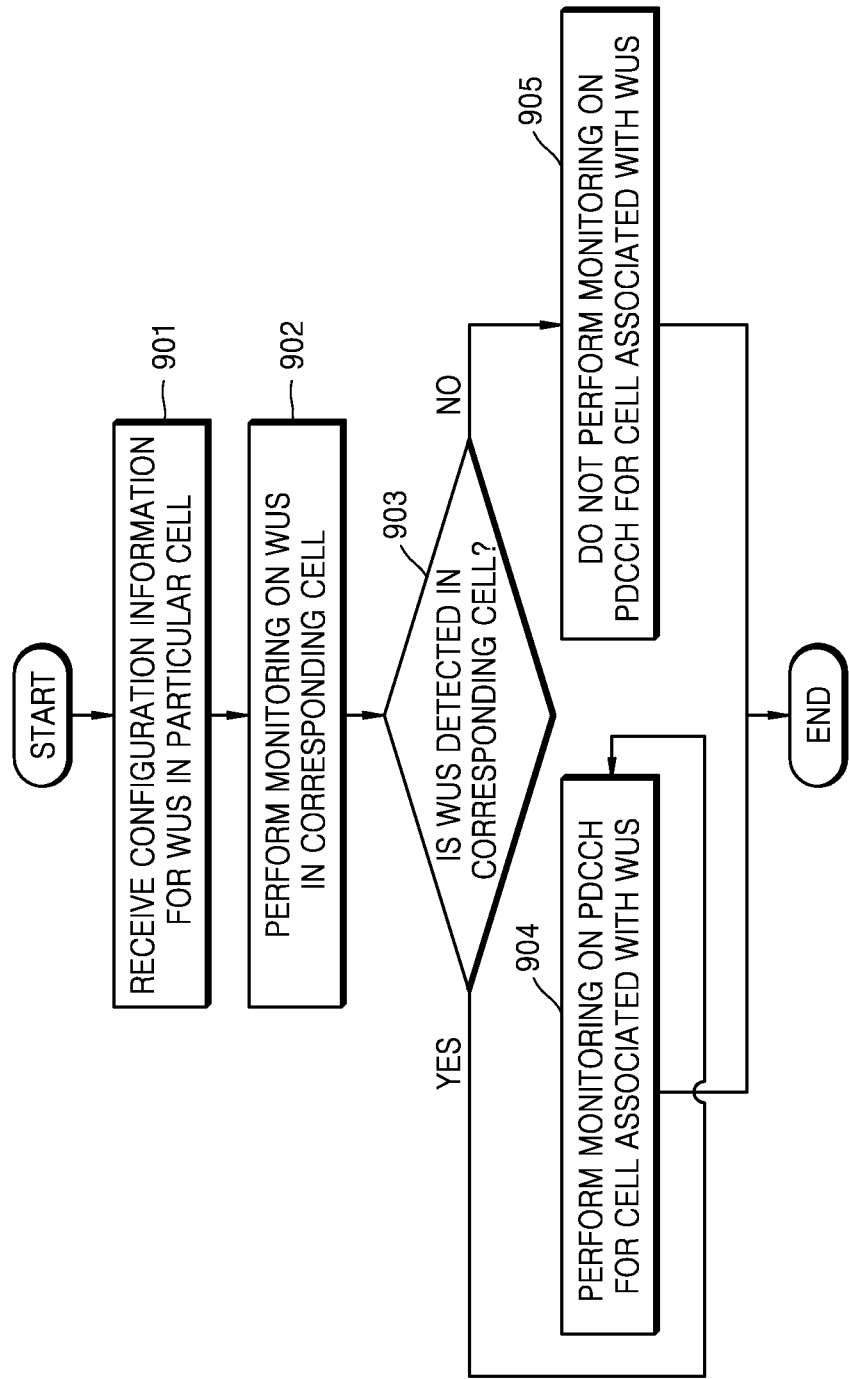
FIG. 9 illustrates an operation of a terminal, according to some embodiments of the disclosure.

FIG. 9 illustrates an operation of the UE, according to some embodiments of the disclosure.

In operation 901, the UE may receive, from the BS, configuration information for a WUS in a particular cell (one or more cells).

Thereafter, the BS may transmit, to the UE, the WUS in the corresponding cell (one or more cells), and in operation 902, the UE may perform monitoring on the WUS in a cell for which the WUS is configured.

In operation 903, the UE may determine whether the WUS is detected. When the WUS is detected in operation 903, the UE may control monitoring of a PDCCH for a cell associated with the detected WUS. For example, when the WUS is detected, the UE may perform monitoring on the PDCCH for the cell associated with the detected WUS. When the WUS is not detected in operation 903, the UE may control monitoring of a PDCCH for a cell associated with the detected WUS. For example, when the WUS is not detected, the UE may not perform monitoring on the PDCCH for the cell associated with the detected WUS.

Hereinbelow, various methods of controlling, by the WUS, monitoring of PDCCHs for a plurality of cells operating by CA will be described.

2-1st Embodiment

In a 2-1st embodiment of the disclosure, a method of notifying the UE of a relationship between a WUS and a cell will be described.

The relationship between the WUS and the cell may be determined by at least one or a combination of one or more of the following methods.

Method 1: A relationship between the WUS and the cell may be pre-defined (e.g., associated with all cells with a WUS activated).

Method 2: A relationship between the WUS and the cell may be pre-defined (e.g., associated with all cells with a WUS configured).

Method 3: A relationship between the WUS and the cell may be notified from the BS to the UE through higher layer signaling, for example, MIB, SIB, or RRC signaling.

Method 4: Index information for a cell associated with the WUS may be notified from the BS to the UE through L1 signaling, for example, UE-specific DCI or group-common DCI.

Method 5: Index information for a cell associated with the WUS may be notified from the BS to the UE through the corresponding WUS. That is, the information notified by the WUS may include index information for a cell to be controlled by the corresponding WUS.

Method 6: The BS may configure, to the UE, information for a cell candidate group in a form of a table to control a monitoring operation on a PDCCH by a WUS, through higher layer signaling (e.g., MIB, SIB, or RRC signaling). For example, the BS may configure, to the UE, a table including indexes of Y(≤X) cells among a total of X cells. Among the cells in the table configured through the higher layer signaling, index information for cells associated with the WUS may be notified from the BS to the UE through L1 signaling, for example, UE-specific DCI, group-common DCI, or the WUS. When a table including a total of Y entries is configured, the table may be indicated to the UE in bits of ceil(log 2(Y)) through L1 signaling.

2-2nd Embodiment

The BS may configure, for the UE, a WUS to a particular cell (e.g., a primary cell (Pcell) or a primary secondary cell (PScell), etc.), and the UE may monitor the WUS in a corresponding cell for which the WUS is configured. In this regard, the WUS may be associated with all or some of activated cells among cells configured for the UE. That is, the BS may notify information for a cell associated with the WUS among the activated cells for the UE by using various methods (see the 2-1st embodiment). The UE may perform monitoring on the WUS in the particular cell, and when the WUS is detected, may perform monitoring control on PDCCHs of cells associated with the detected WUS among the activated cells (in a case of the WUS, the UE performs monitoring on the PDCCHs).

2-3rd Embodiment

The BS may configure, for the UE, a WUS to a particular cell (e.g., a Pcell or a PScell), and the UE may monitor the WUS in a corresponding cell for which the WUS is configured. In this regard, the WUS may be associated with all or some of cells configured for the UE. That is, the BS may notify information for a cell associated with the WUS among the cells configured for the UE by using various methods (see the 2-1st embodiment). The UE may perform monitoring on the WUS in the particular cell, and when the WUS is detected, may activate cells associated with the detected WUS among the configured cells and perform monitoring control on PDCCHs of the activated cells (in a case of the WUS, the UE performs monitoring on the PDCCHs). The UE may perform monitoring on the WUS in the particular cell, and when the WUS is not detected, may deactivate cells associated with the corresponding WUS among the configured cells and perform monitoring control on PDCCHs of the deactivated cells (in a case of the WUS, the UE does not perform monitoring on the PDCCHs).

2-4th Embodiment

The BS may configure, for the UE, a WUS to a cell corresponding to a "first cell", and the UE may monitor the WUS in the cell for which the WUS is configured. In this case, the "first cell" may correspond to a cell configured to perform monitoring on a PDCCH (that is, a cell performing scheduling). In further detail, the WUS may be configured with respect to cells performing self-carrier scheduling. Also, the WUS may be configured with respect to a cell performing scheduling, that is, a cell configured to perform monitoring on the PDCCH, among cells operating by cross-carrier scheduling.

The WUS may be associated with all cells scheduled by the "first cell". That is, in a case of a cell on which self-carrier scheduling is performed, the corresponding cell may be associated with the WUS. In a case of the cross-carrier scheduling, a cell performing cross-carrier scheduling and a cell scheduled by cross-carrier scheduling may both be associated with the WUS. This will be described below in detail with reference to FIG. 8. In FIG. 8, it is assumed that cross-carrier scheduling is applied to a set of the cells, the CC #0 801, the CC #1 802, the CC #2 803, and the CC #3 804, and in this regard, it is assumed that the CC #0 801 is a cell performing scheduling, that is, a cell corresponding to the "first cell". In this case, the WUS 800 may be configured and transmitted from the CC #0 801 corresponding to the "first cell", and the WUS 800 may be associated with the set of the cells, the CC #0 801, the CC #1 802, the CC #2 803, and the CC #3 804, to which cross-carrier scheduling is applied.

The UE may perform monitoring on the WUS in the cell corresponding to the "first cell", and when the WUS is detected, may perform monitoring control on PDCCHs for cells associated with the detected WUS (that is, cells scheduled by the cell corresponding to the "first cell") (in a case of the WUS, the UE performs monitoring on the PDCCHs).

Figure 10:
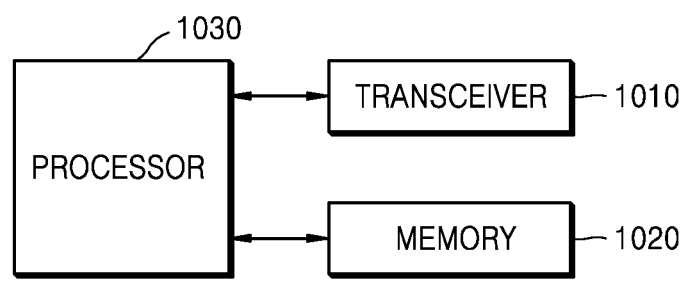
FIG. 10 is a block diagram of an internal structure of a terminal, according to some embodiments of the disclosure.
Figure 11:
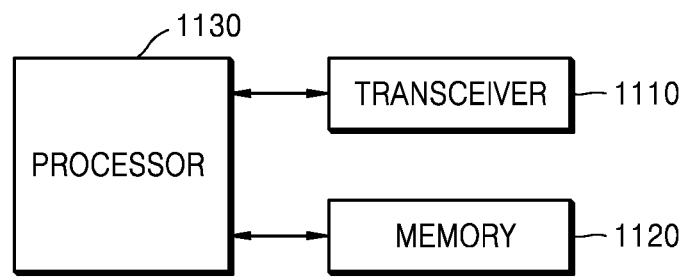
FIG. 11 is a block diagram of an internal structure of a base station, according to some embodiments of the disclosure.

In order to carry out the above-described embodiments of the disclosure, transceivers, memories, and processors of the UE and the BS are shown in FIGS. 10 and 11, respectively. In order to apply the above-described methods of monitoring the PDCCH in the 5G communication system, the BS and the UE may transmit and receive information to and from each other, and in order to carry out the methods of monitoring the PDCCH in the 5G communication system, each of the transceivers, the memories, and the processors of the BS and the UE should operate according to embodiments of the disclosure.

FIG. 10 is a block diagram of an internal structure of the UE, according to some embodiments of the disclosure. As shown in FIG. 10, the UE according to an embodiment of the disclosure may include a transceiver 1010, a memory 1020, and a processor 1030. However, the components of the UE are not limited thereto. For example, the UE may include more or fewer components than those described above. In addition, the processor 1030, the transceiver 1010, and the memory 1020 may be implemented as a single chip.

The transceiver 1010 may transmit and receive signals to and from the BS. The signal transmitted and received to and from the BS may include control information and data. The transceiver 1010 may include a RF transmitter for up-converting and amplifying a frequency of a transmitted signal, and a RF receiver for amplifying low-noise and down-converting a frequency of a received signal. However, this is merely an example, and components of the transceiver 1010 are not limited to the RF transmitter and the RF receiver. The transceiver 1010 may receive a signal through a radio channel and output the received signal to the processor 1030, and transmit a signal output from the processor 1030 through the radio channel.

According to some embodiments of the disclosure, the memory 1020 may store a program and data required for operations of the UE. Also, the memory 1020 may store the control information or data included in the signal transmitted and received by the UE. The memory 1020 may include a storage medium such as read only memory (ROM), random access memory (RAM), hard-disk, compact disc (CD)-

ROM, digital versatile disc (DVD), etc., or a combination thereof. Also, a plurality of memories 1020 may be provided. The memory 1020 may store a program to perform a monitoring operation on a low power mode indicator and a PDCCH according to the aforementioned embodiments of the disclosure.

According to some embodiments of the disclosure, the processor 1030 may control a series of processes for the UE to operate according to an embodiment of the disclosure. For example, the processor 1030 may control the components of the UE to perform the monitoring operation on the low power mode indicator and the PDCCH of the UE according to the embodiments of the disclosure. A plurality of processors 1030 may be provided. The processor 1030 may execute a program stored in the memory 1020 to perform a monitoring operation on a WUS and the PDCCH according to the aforementioned embodiments of the disclosure.

FIG. 11 is a block diagram of an internal structure of the BS, according to some embodiments of the disclosure. As shown in FIG. 11 the BS according to an embodiment of the disclosure may include a processor 1130, a transceiver 1110, and a memory 1120. However, the components of the BS are not limited thereto. For example, the BS may include more or fewer components than those described above. In addition, the processor 1130, the transceiver 1110, and the memory 1120 may be implemented as a single chip.

The transceiver 1110 may transmit and receive signals to and from the UE. The signal transmitted or received to or from the UE may include control information and data. The transceiver 1110 may include a RF transmitter for up-converting and amplifying a frequency of a transmitted signal, and a RF receiver for amplifying low-noise and down-converting a frequency of a received signal. However, this is merely an example, and components of the transceiver 1110 are not limited to the RF transmitter and the RF receiver. The transceiver 1110 may receive a signal through a radio channel and output the received signal to the processor 1130, and transmit a signal output from the processor 1130 through the radio channel.

According to some embodiments of the disclosure, the memory 1120 may store a program and data required for operations of the BS. Also, the memory 1120 may store the control information or data included in the signal transmitted and received by the BS. The memory 1120 may include a storage medium such as ROM, RAM, hard-disk, CD-ROM, DVD, etc., or a combination thereof. Also, a plurality of memories 1120 may be provided. According to some embodiments of the disclosure, the memory 1120 may store a program to perform a method of configuring a low power mode indicator, a method of transmitting a low power mode indicator, a method of transmitting a PDCCH, etc. according to the aforementioned embodiments of the disclosure.

The processor 1130 may control a series of processes for the BS to operate according to an embodiment of the disclosure. For example, the processor 1130 may control the components of the BS to perform the method of configuring the low power mode indicator, the method of transmitting the low power mode indicator, the method of transmitting the PDCCH, etc. according to the embodiments of the disclosure. A plurality of processors 1130 may be provided. The processor 1130 may execute a program stored in the memory 1120 to perform the method of configuring the low power mode indicator, the method of transmitting the low power mode indicator, the method of transmitting the PDCCH, etc. according to the aforementioned embodiments of the disclosure.

The methods according to the embodiments described in the claims or the detailed description of the disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in a device. The one or more programs may include instructions that cause the electronic device to perform the methods in accordance with the claims of the disclosure or the embodiments described in the specification.

The programs (e.g., software modules or software) may be stored in RAM, non-volatile memory including flash memory, ROM, electrically erasable programmable read-only memory (EEPROM), a magnetic disc storage device, CD-ROM, a DVD, another type of optical storage device, or a magnetic cassette. Alternatively, the programs may be stored in a memory configured by a combination of some or all of such storage devices. Each of the memories may be provided in the plural.

Furthermore, the program may be stored in an attachable storage device that may be accessed through communication networks, such as the Internet, Intranet, a local area network (LAN), a wide LAN (WLAN), and a storage area network (SAN), or a communication network configured in a combination thereof. The storage device may be connected through an external port to an apparatus according to the embodiments of the disclosure. Another storage device on the communication network may also be connected to the apparatus performing the embodiments of the disclosure.

In the aforementioned embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

The embodiments of the disclosure set forth in the present specification and drawings are merely intended to provide examples to easily explain the technical matters of the disclosure and help understanding of the disclosure, and are not intended to limit the scope of the disclosure. In other words, it will be apparent to one of ordinary skill in the art that other modifications based on the technical ideas of the disclosure are feasible. Also, the embodiments may be combined with each other as required. For example, a portion of one embodiment of the disclosure and a portion of another embodiment of the disclosure may be combined with each other to enable a BS and a UE to operate. Further, the embodiments of the disclosure are also applicable to another communication system, and other modifications based on technical ideas of the embodiments are also feasible.

The invention claimed is:

1. A method, performed by a terminal supporting carrier aggregation, of monitoring a physical downlink control channel (PDCCH), the method comprising:
receiving, in at least one of a plurality of cells, configuration information including a low power mode indicator that controls monitoring of a PDCCH, in at least one of a plurality of cells and a table including indexes of $Y(\leq X)$ cells among a total of X cells;

based on the configuration information, determining whether the low power mode indicator is detected, in at least one cell for which the configuration information is received; and based on a result of the determining and information about a cell associated with the low power mode indicator, controlling the monitoring of the PDCCH, in a cell associated with the low power mode indicator from among the plurality of cells, wherein the table is indicated in bits of ceil(log 2(Y)) through L1 signaling.

2. The method of claim 1, wherein the low power mode indicator comprises, as a signal for controlling the monitoring, at least one of downlink control information (DCI), a wake-up signal (WUS), a go-to-sleep (GTS) signal, or a monitoring adaptation signal (MAS).

3. The method of claim 1, wherein the receiving of the configuration information comprises receiving the configuration information through higher layer signaling including a master information block (MIB), a system information block (SIB), or a radio resource control (RRC) message.

4. The method of claim 1, wherein the configuration information comprises at least one of transmission resource information, transmission period information, monitoring duration information, occasion configuration information, transmission configuration indicator (TCI) information, or quasi co-located (QCL) configuration information, for detection of the low power mode indicator.

5. The method of claim 1, wherein information about the cell associated with the low power mode indicator is comprised in higher layer signaling received from a base station, comprised in the configuration information, or comprised in the low power mode indicator.

6. The method of claim 1, wherein the cell associated with the low power mode indicator comprises an activated cell from among the plurality of cells, or comprises a cell pre-defined by the base station from among the plurality of cells.

7. The method of claim 1, wherein the controlling of the monitoring of the PDCCH comprises:

when the low power mode indicator is determined to have been detected, performing monitoring for detecting the PDCCH in the cell associated with the low power mode indicator, based on information about the cell associated with the low power mode indicator; and when the low power mode indicator is determined to have not been detected, not performing monitoring for detecting the PDCCH in the cell associated with the low power mode indicator, based on the information about the cell associated with the low power mode indicator.

8. The method of claim 1, wherein the at least one cell for which the configuration information is received is a cell corresponding to a frequency band lower than or equal to a certain frequency, and the cell associated with the low power mode indicator is a cell corresponding to a frequency band higher than or equal to a certain frequency.

9. A terminal supporting carrier aggregation, the terminal comprising:

a transceiver; and at least one processor connected to the transceiver, wherein the at least one processor is further configured to:

receive, in at least one of a plurality of cells, configuration information including a low power mode indicator that controls monitoring of a physical downlink control channel (PDCCH) and a table including indexes of Y(≤X) cells among a total of X cells;

based on the configuration information, determine whether the low power mode indicator is detected, in at least one cell for which the configuration information is received; and based on a result of the determining and information about a cell associated with the low power mode indicator, control the monitoring of the PDCCH, in a cell associated with the low power mode indicator from among the plurality of cells, wherein the table is indicated in bits of ceil(log 2(Y)) through L1 signaling.

10. The terminal of claim 9, wherein the low power mode indicator comprises, as a signal for controlling the monitoring, at least one of downlink control information (DCI), a wake-up signal (WUS), a go-to-sleep (GTS) signal, or a monitoring adaptation signal (MAS).

11. The terminal of claim 9, wherein the configuration information comprises at least one of transmission resource information, transmission period information, monitoring duration information, occasion configuration information, transmission configuration indicator (TCI) information, or quasi co-located (QCL) configuration information, for detection of the low power mode indicator.

12. The terminal of claim 9, wherein information about the cell associated with the low power mode indicator is comprised in higher layer signaling received from the base station, comprised in the configuration information, or comprised in the low power mode indicator.

13. The terminal of claim 9, wherein the cell associated with the low power mode indicator comprises an activated cell from among the plurality of cells, or comprises a cell pre-defined by a base station from among the plurality of cells.

14. The terminal of claim 9, wherein the cell associated with the low power mode indicator comprises an activated cell from among the plurality of cells, or comprises a cell pre-defined by a base station from among the plurality of cells.

15. The terminal of claim 9, wherein the at least one processor is further configured to:

when the low power mode indicator is determined to have been detected, perform monitoring for detecting the PDCCH in the cell associated with the low power mode indicator, based on information about the cell associated with the low power mode indicator; and when the low power mode indicator is determined to have not been detected, not perform monitoring for detecting the PDCCH in the cell associated with the low power mode indicator, based on the information about the cell associated with the low power mode indicator.

* * * * *